United States Patent
Miyazawa et al.

(10) Patent No.: US 8,041,117 B2
(45) Date of Patent: Oct. 18, 2011

(54) IMAGE PROCESSING SYSTEM, COMPUTER READABLE MEDIUM STORING IMAGE PROCESSING PROGRAM AND COMPUTER DATA SIGNAL EMBEDDED WITH THE IMAGE PROCESSING PROGRAM

(75) Inventors: Natsumi Miyazawa, Kanagawa (JP); Hiroyuki Kawano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1119 days.

(21) Appl. No.: 11/878,266

(22) Filed: Jul. 23, 2007

(65) Prior Publication Data
US 2008/0025607 A1 Jan. 31, 2008

(30) Foreign Application Priority Data
Jul. 28, 2006 (JP) ................. 2006-205795

(51) Int. Cl.
*G06K 9/34* (2006.01)
*G06K 9/18* (2006.01)
(52) U.S. Cl. ........ 382/176; 382/182; 382/184; 348/468; 386/241; 386/245
(58) Field of Classification Search .......... 382/182, 382/176–179, 184; 386/241, 244, 245; 348/468
See application file for complete search history.

(56) References Cited

FOREIGN PATENT DOCUMENTS
JP A-2000-182028 6/2000

OTHER PUBLICATIONS
Lyu et al, A Comprehensive Method for Multilingual Video Text Detection, Localization, and Extraction, Feb. 2005, IEEE Transactions on Circuits and Systems for Video Technology, vol. 15, Issue 2, p. 243-255.*

* cited by examiner

*Primary Examiner* — Aaron Carter
(74) *Attorney, Agent, or Firm* — Oliff & Berridge, PLC

(57) ABSTRACT

An image processing system includes an image input section, a first character-extracting section, a second character-extracting section and a synthesizing section. The image input section inputs images which are linked to each other in time series manner. The first character-extracting section extracts a character from a first image input by the image input section. The second character-extracting section extracts a character from a second image input by the image input section. The synthesizing section generates a character string in accordance with the character extracted by the first character-extracting section and the character extracted by the second character-extracting section.

18 Claims, 9 Drawing Sheets

IMAGE PROCESSING SYSTEM, COMPUTER READABLE MEDIUM STORING IMAGE PROCESSING PROGRAM AND COMPUTER DATA SIGNAL EMBEDDED WITH THE IMAGE PROCESSING PROGRAM

CROSS-REFERENCE TO RELATED APPLICATIONS

This application is based on and claims priority under 35 U.S.C. §119 from Japanese Patent Application No. 2006-205795 filed Jul. 28, 2006.

BACKGROUND

1. Technical Field

The invention relates to an image processing system, a moving image editing processing system, an image processing apparatus, a moving image editing processing apparatus, a computer readable medium storing an image processing program or a moving image editing processing program, and a computer data signal embedded with the image processing program or the moving image editing processing program.

2. Related Art

A moving image is stored in a storage medium such as a DVD and a hard disk. Recently, moving image reproducing apparatuses configured to be able to reproduce the moving image from the storage medium using a computer have been developed. Also, a moving image retrieval technique for allowing an operator to easily retrieve an image that the operator wants to view from the moving image has been developed.

Here, subtitles, telops, etc. which appear in the moving image are detected automatically, and characters such as subtitles are used as indexes.

SUMMARY

According to an aspect of the invention, an image processing system includes an image input section, a first character-extracting section, a second character-extracting section and a synthesizing section. The image input section inputs images which are linked to each other in time series manner. The first character-extracting section extracts a character from a first image input by the image input section. The second character-extracting section extracts a character from a second image input by the image input section. The synthesizing section generates a character string in accordance with the character extracted by the first character-extracting section and the character extracted by the second character-extracting section.

BRIEF DESCRIPTION OF THE DRAWINGS

Exemplary embodiments of the invention will be described in detail below with reference to the accompanying drawings, wherein.

DETAILED DESCRIPTION

Hereinafter, exemplary embodiments of the invention will be described with reference to the drawings.

Figure 1:
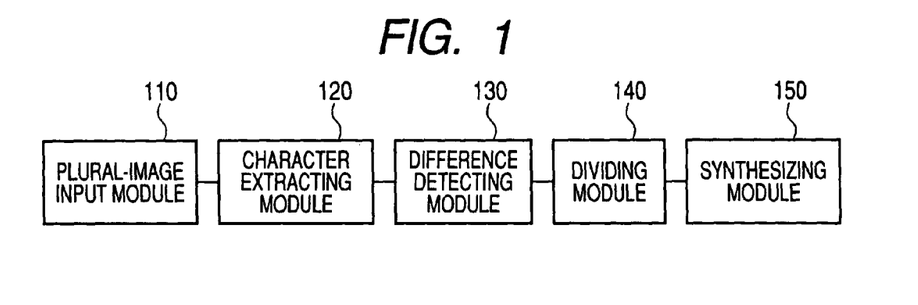
FIG. 1 is a conceptual module block diagram of an exemplary embodiment.

Each drawing shows an exemplary embodiment of the invention. FIG. 1 shows a conceptual module block diagram of the exemplary embodiment.

In addition, the term "module" generally means logically separable software, and components such as hardware. Accordingly, the module in the exemplary embodiment means not only a module in a program but a module in a hardware configuration. Therefore, the exemplary embodiment also serves to describe a program, an apparatus, a system, and a method. Further, the module corresponds to its function substantially one to one. However, in implementation, one module may be made up of one program, and plural modules may be made up of one program, or conversely, one module may be made up of plural programs. Further, plural modules may be executed by one computer, and one module may be executed by plural computers in a dispersed or parallel environment. Further, in the following description, the term "connection" includes logical connection in addition to physical connection.

Further, the term "system" also includes a case where it is realized by one computer besides a configuration in which plural computers, hardware, apparatuses, etc. are connected together over a network, etc.

The exemplary embodiment has a plural-image input module 110, a character extracting module 120, a difference detecting module 130, a dividing module 140 and a synthesizing module 150.

The plural-image input module 110 inputs plural images. Here, the plural images are time-seriously continuous images, and specifically, a moving image. However, the plural images maybe plural time-serially continuously shot still images like panoramic images. In the case of a moving image, each image corresponds to a frame image of the moving image. Here, the time-serially continuous images are plural images between which there is a temporal context. Characters in the time-serially continuous image are at least continuous semantically. For example, in the case of a moving image, the interval between the time-serially continuous images may be a regular time interval. A frame image whose contents change severely (for example, if the moving image is compressed, an image whose compressed volume is large is detected as a frame image) may be selected as a target. Further, the term "frame image" means an image for one screen in the case of displaying a moving image, and means an image among plural images in the case of displaying a still image.

Further, it is assumed herein that characters, such as subtitles and telops, are present within an image to be input. Further, the characters are not limited to the subtitles, but may be characters captured in an image. Also, the characters are not necessarily limited to ones that can be read well. For example, there is also the case where a color of characters is the same as the color of a background, and thus the characters cannot be read.

The character extracting module 120 extracts characters from an image input by the plural-image input module 110. Here, as a technique of character extraction, a text/image separating technique, an MRC (Mixed Raster Content) technique, etc. may be used. In the case where an image input by the plural-image input module 110 is a moving image, images to be processed by the character extracting module 120 are frame images. The character extracting module 120 may extract characters from every frame image. Further, in the case of a moving image, there may be almost no change between frames. Thus, a frame image to be processed may be selected at certain intervals.

In addition, among the images to be processed by the character extracting module 120, a time-serially previous image may be referred to as an ""A" image," and an image that is time-serially subsequent to the "A" image may also be referred to as a ""B" image." It is not necessary that the "A" image and the "B" image are temporarily adjacent to each other so long as the "A" image and the "B" image have a temporal context. Also, there may be plural images between the "A" image and the "B" image.

Here, the expression "extracts a character" may include the case where a character is recognized from an image of the extracted character and obtained as text data, in addition to the case where the character is extracted as an image.

Further, there is also the case where the character extracting module 120 cannot extract characters. As mentioned above, this is, for example, a color of a character is the same as a color of a background, and thus the character cannot be read.

The difference detecting module 130 detects a difference between a character extracted from the "A" image by the character extracting module 120 and a character extracted from the "B" image by the character extracting module.

When characters are extracted as images by the character extracting module 120, the difference detecting module 130 compares the images (pattern matching) to detect a difference as an image.

Also, when characters extracted by the character extracting module 120 are text data after recognition of the characters, a difference is detected as text data.

The dividing module 140 divides the difference detected by the difference detecting module 130 in accordance with number of images between the "A" image and the "B" image that are target images of the character extracting module 120. Here, the case where there is an image between the "A" image and the "B" image includes not only the case where a frame image to be processed is selected at certain intervals as described, but also the case where characters cannot be extracted by the character extracting module 120. Here, the expression "divides the difference in accordance with the number of images between the "A" image and the "B" image" means that the difference is divided by number obtained by adding 1 to the number of images between the "A" image and the "B" image because the difference includes the "B" image.

The dividing module 140 may not operate in some cases. This is because when a difference cannot be detected by the difference detecting module 130, it is not necessary to divide a difference (when characters of the "A" image and characters of the "B" image are the same).

In other cases, that is, when characters cannot be extracted from images between the "A" image and the "B" image by the character extracting module 120 but a difference is detected by the difference detecting module 130, this difference is divided in accordance with the number of images between the "A" image and the "B" image.

The synthesizing module 150 synthesizes portions obtained by dividing the difference characters by the dividing module 140, with the respective images between the "A" image and the "B" image.

Further, when characters cannot be extracted from the images between the "A" image and the "B" image by the character extracting module 120 and a difference character between the "A" image and the "B" image is not detected by the difference detecting module 130, the character extracted from the "A" image or the character extracted from the "B" image is synthesized with the images (images from which characters cannot be extracted) between the "A" image and the "B" image.

Further, when a difference is detected by the difference detecting module 130, a character string is generated and this character string is synthesized with the "B" image on the basis of the character extracted from the "A" image by the character extracting module 120 and the character extracted from the "B" image by the character extracting module 120.

Further, the synthesizing module 150 also synthesizes a character string according to the character extracted from the "A" image and the character extracted from the "B" image, in addition to generating the character string.

Next, an operation of this exemplary embodiment will be described.

Figure 2:
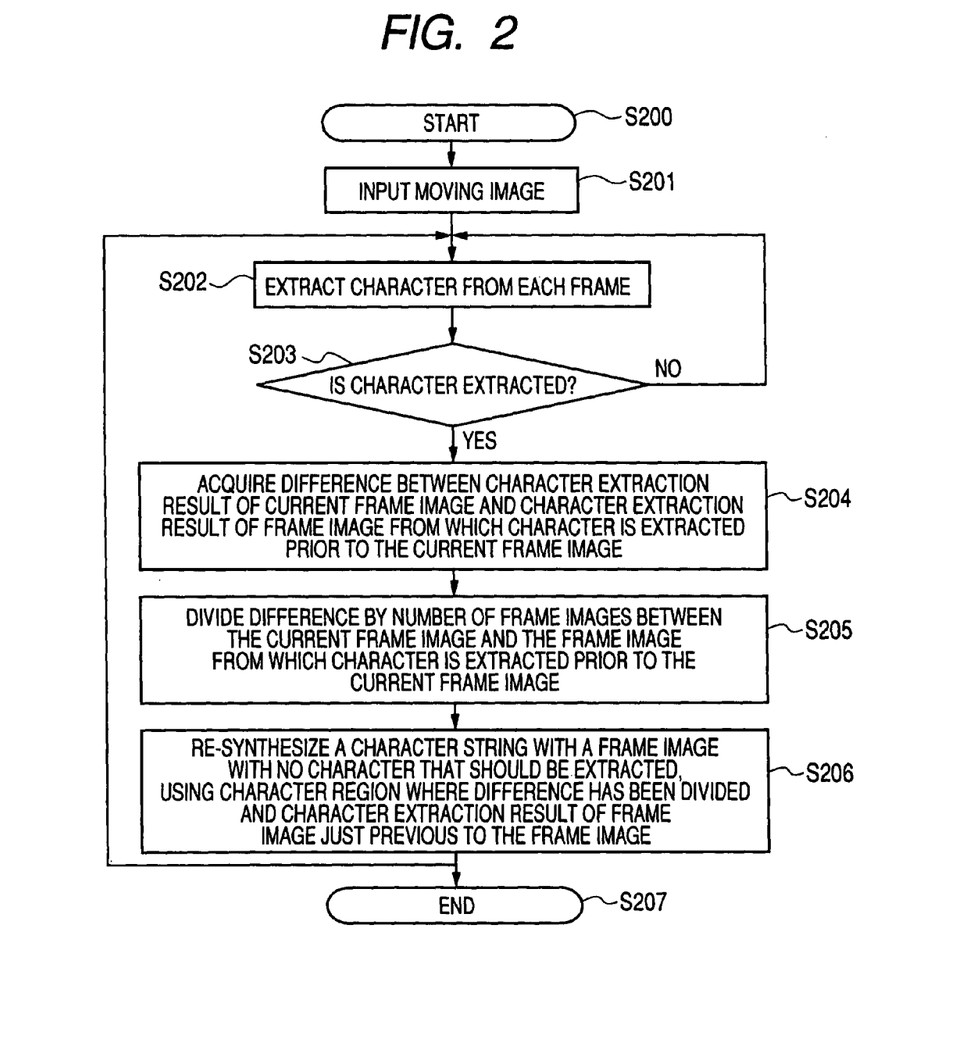
FIG. 2 shows an exemplary flowchart showing a character extracting process according to the exemplary embodiment.

The character extracting process according to the exemplary embodiment will be described with reference to FIG. 2.

In step S201, the plural-image input module 110 inputs a moving image. Frame images are input.

Instep S202, the character extracting module 120 extracts a character from each frame image.

In step S203, it is determined as to whether or not the character extracting module 120 extracted a character successfully. At this time, if a character is extracted successfully, the process proceeds to step S204. If a character is failed to be extracted, the process returns to step S202. That is, step S202 will be repeated until a character is extracted successfully. As a result, if there is no character in a frame image or a character is failed to be extracted due to a relationship between a color of a character and a color of a background in the frame image, the process is looped.

In Steps 204, the difference detecting module 130 acquires a difference between a character extraction result of a current frame image and a character extraction result of a frame image from which a character is extracted successfully prior to the current frame image.

In step S205, the dividing module 140 divides the difference acquired in step S204 by number of frame images between the current frame image and the frame image from which the character is extracted successfully prior to the current frame image.

In step S206, the synthesizing module 150 re-synthesizes a character string in a frame image with no character that should be extracted, using a character region into which the difference has been divided and a character extraction result of a frame image just previous to the frame image in question. The expression "a frame image with no character that should be extracted" is a frame image for which the answer is set to "No" in step S203.

Then, the process is repeated for all the frame images in the moving image input by the plural-image input module 110 till the completion thereof. That is, the process returns to step S202, and the process from step S202 to step S206 is performed up to the last frame image.

A specific example of the character extracting process according to the exemplary embodiment will be described with reference to FIGS. 3 to 6 and FIG. 11. Although the Japanese characters are illustrated in the figures, one skilled in the art would appreciate that the exemplary embodiment shown in the figures can apply to the case where time-seriously continuous images include English characters (e.g., alphabet) or characters in any other language.

Figure 3:
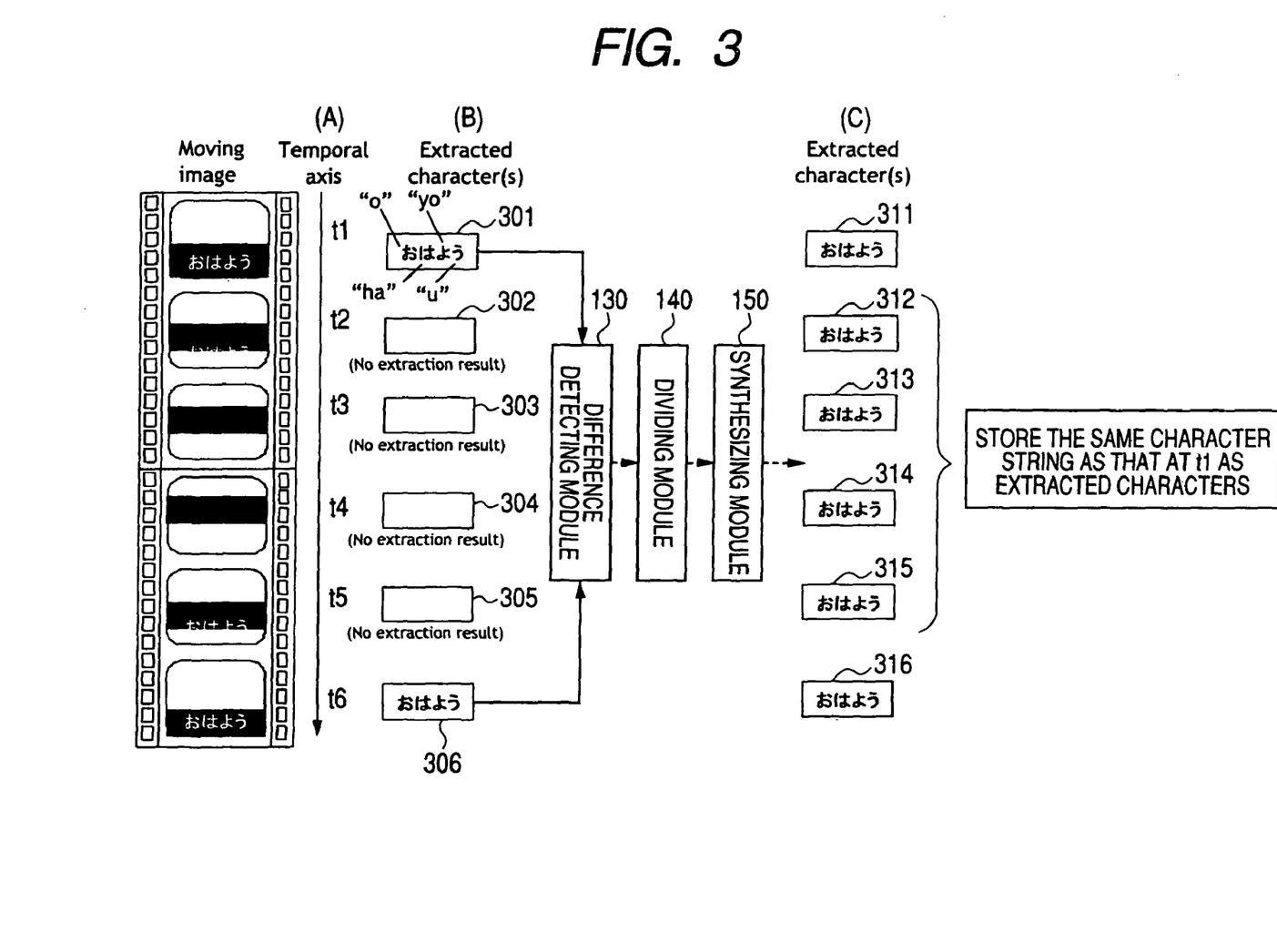
FIG. 3 is an explanatory view illustrating a specific example (example 1) of the character extracting process according to the exemplary embodiment.

FIG. 3 shows the case where there is a frame image from which a character is extracted successfully, then there are plural continuous frame images from which a character is failed to be extracted, and thereafter there is a frame image from which a character is extracted successfully.

FIG. 3(A) shows (six) frame images of a moving image input by the plural-image input module 110, along temporal axis (t1 to t6). As shown in FIG. 3(A), a frame image at time t1 is an image from which white a character "o ha yo u" can be read in a black background color. It is noted that Japanese word "o ha yo u" means good morning. Although the frame images from a time t2 to a time t5 have white characters "o ha yo u", these characters cannot be read due to the relationship between the white characters and the background color. A frame image at a time t6 is an image from which the white characters "o ha yo u" can be read in the black background color like the frame image at the time t1.

FIG. 3(B) shows results when the character extracting module 120 has extracted characters from the frame images on the temporal axis. In this case, a character image "o ha yo u" (301 and 306 in FIG. 3) can be extracted from the frame images at the time t1 and t6. No character image is be extracted from the frame images at the time t2 to t5 (302, 303, 304 and 305 in FIG. 3). That is, in the flowchart of FIG. 2, results of processes for the frame images at the time t2 to t5 become "No" in step S203. Process from step S204 to step S206 is performed for the frame image at the time t6.

The difference detecting module 130 acquires a difference between a character extraction result of a current frame image (at the time t6) and a character extraction result of a frame image (at the time t1) from which characters are extracted prior to the current frame image. An example of a method for extracting the difference is pattern matching. The character extraction result at the time t6 is "o ha yo u" (306 of FIG. 3). Also, the character extraction result at the time t1 is "o ha yo u" (301 of FIG. 3). Accordingly, it is determined that there is no difference therebetween in this case.

The dividing module 140 divides the difference in accordance with the number of frame images between the current frame image (at the time t6) and the frame image (at the time t1) from which characters are extracted prior to the current frame image. In this case, the difference will be divided by 5 (5 obtained by adding 1 to the number "4" of frames between the time t1 and the time t6). However, since no difference is detected, the process of dividing by the dividing module 140 is not performed.

The synthesizing module 150 synthesizes the result at the time t1 with a result obtained by dividing the difference, as a character extraction result of the frame image at the time t2. In this case, since there is no divided image, the character extraction result of the frame image at the time t2 is the same as the character extraction result at the time t1. Of course, this is the same if the character extraction result at the time t6 is used.

The same is true in the cases of the time t3 to the time t5. In this case, the character extraction result at the time t1 or the time t6 becomes character extraction results at the time t3 to the time t5, as it is. That is, as shown in FIG. 3 (A), "o ha yo u" which is an image of the extracted characters is associated with the frame images at the time bases t2 to t5 (312, 313, 314, and 315 of FIG. 3), and is synthesized with each frame image.

Figure 4:
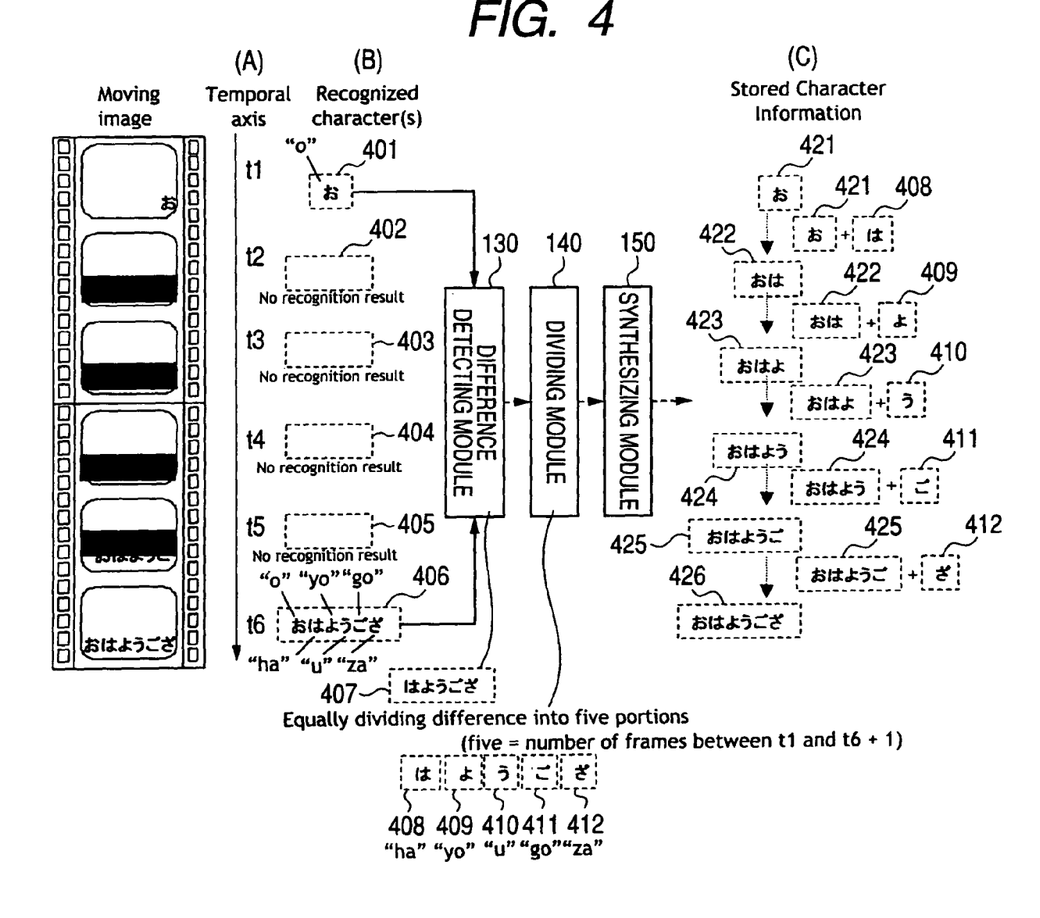
FIG. 4 is an explanatory view illustrating a specific example (example 2) of the character extracting process according to the exemplary embodiment.

FIG. 4 shows the case where there is a frame image from which a character is extracted, then there are plural continuous frame images from which a character is not extracted, and thereafter, there is a frame image from which a character is extracted. This example is different from the example of FIG. 3 in that the character extracting module 120 not only extracts a character as an image, but also performs character recognition to handle text data, which is a result of the character recognition, as extracted characters. Further, although there is no difference in FIG. 3, FIG. 4 shows the case where there is some difference.

FIG. 4(A) shows (six) frame images of a moving image input by the plural-image input module 110 according to times bases (t1 to t6).

As shown in this figure, a frame image at a time t1 is an image from which a black character "o" can be read in a white background color. Although frame images from a time t2 to a time t5 have black characters "o ha", "o ha yo", "o ha yo u", and "o ha yo u go", respectively, these characters cannot be read due to the relationship between the black characters and the background color. A frame image at a time t6 is an image from which black characters "o ha yo u go za" can be read in a white background color. It is noted that the Japanese word "o ha yo u go za i ma su" is a respectful form of "o ha yo u" and means good morning.

FIG. 4(B) shows results when the character extracting module 120 has recognized characters from the frame images on the temporal axis. In this case, the character "o" (401 of FIG. 4) is recognized from the frame image at the time t1. No character is recognized from the frame images at the time t2 to t5 (402, 403, 404, and 405 of FIG. 4). That is, in the flowchart of FIG. 2, results of process for the frame images at the time t2 to t5 become "No" in Step S203. The characters "o ha yo u go za" (406 of FIG. 4) is recognized from the frame image at the time t6. Process from step S204 to step S206 is performed for the frame image at the time t6.

The difference detecting module 130 acquires a difference between a character recognition result of a current frame image (at the time t6) and a character recognition result of a frame image (at the time t1) from which characters are recognized prior to the current frame image. As a method of extracting the difference, for example, comparison between texts is performed. The character recognition result at the time t6 is "o ha yo u go za" (406 of FIG. 4), and the character recognition result at the time t1 is "o" (401 of FIG. 4). Accordingly, the difference in this case is "ha yo u go za" (407 of FIG. 4).

The dividing module 140 divides the difference in accordance with the number of frame images between the current frame image (at the time t6) and the frame image (at the time t1) from which a character is recognized prior to the current frame image. In this case, the difference is divided by 5 (5 obtained by adding 1 to the number "4" of frames between the time t1 and the time t6). The result of equally dividing the difference into five portions becomes "ha" (408 of FIG. 4), "yo" (409 of FIG. 4), and "u" (410 of FIG. 4), "go" (411 of FIG. 4), and "za" (412 of FIG. 4).

The synthesizing module 150 synthesizes the result at the time t1 ("N", 421 of FIG. 4) with a result ("ha", 408 of FIG. 4) obtained by dividing the difference, as a character recognition result of the frame image at the time t2. That is, as shown in FIG. 4(C), the synthesized result becomes "o ha" (422 of FIG. 4).

The same is true in the cases of the time t3 to the time t5. That is, as shown in FIG. 4(C), the synthesized results become "o ha yo" (423 of FIG. 4) at the time t3, "o ha yo u" (424 of FIG. 4) at the time t4, "o ha yo u go" (425 of FIG. 4) at the time t5, and "o ha yo u go za" (426 of FIG. 4) at the time t6. Then, each of the above characters is synthesized with the frame image.

Figure 5:
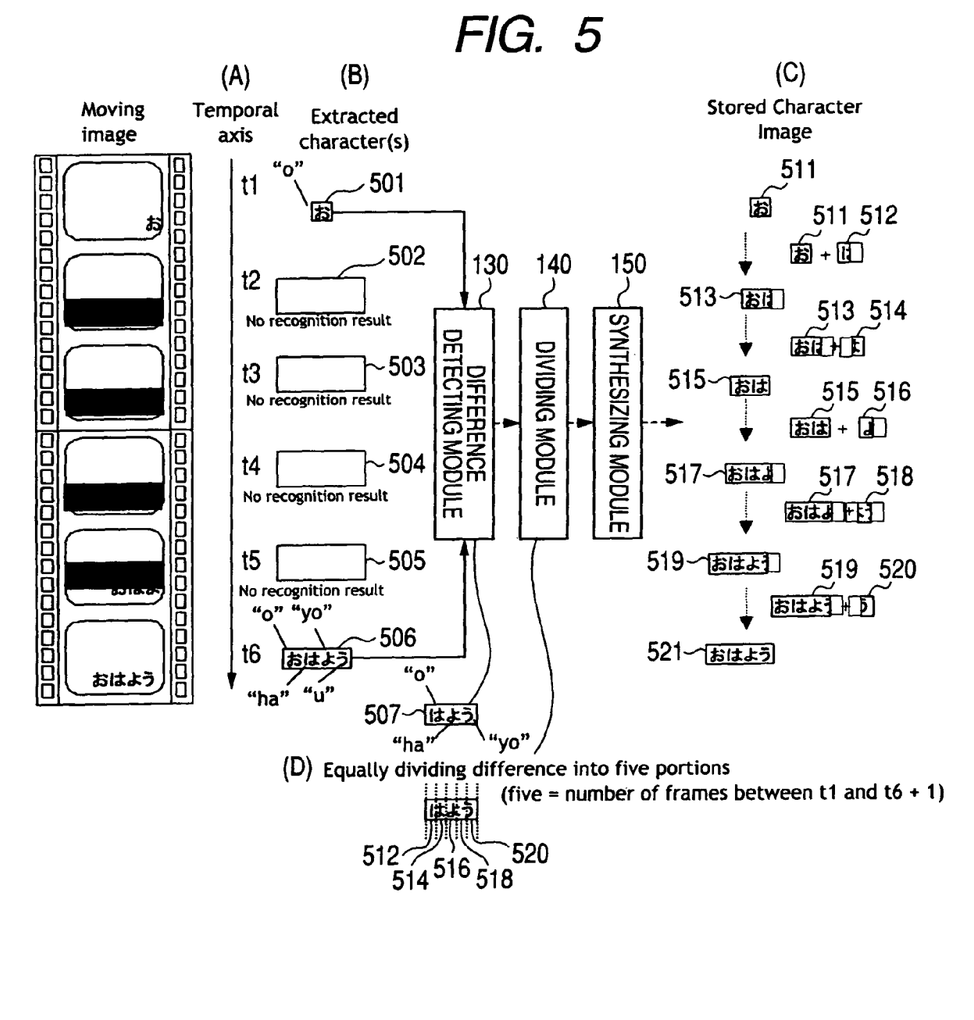
FIG. 5 is an explanatory view illustrating a specific example (example 3) of the character extracting process according to the exemplary embodiment.

FIG. 5 shows the case where there is a frame image from which a character is could be extracted, then there are plural continuous frame images from which characters are be extracted, and thereafter, there is a frame image from which a character is extracted. This example is different from the example of FIG. 4 in that the character extracting module 120 does not perform character recognition, and extracts characters as an image.

FIG. 5(A) shows (six) frame images of a moving image input by the plural-image input module 110 according to time bases (t1 to t6). As shown in this figure, a frame image at a time t1 is an image from which a black character "o" can be read in a white background color. Although frame images from a time t2 to a time t5 have black characters "o ha," and "o ha yo", these characters cannot be read due to the relationship between the black characters and the background color. A frame image at a time t6 is an image from which black characters "o ha yo u" can be read in a white background color.

FIG. 5(B) shows results when the character extracting module 120 extracts characters from the frame images on the temporal axis. In this case, the character "o" (501 of FIG. 5) is extracted from the frame image at the time t1. No character is extracted from the frame images at the time t2 to t5 (502, 503, 504, and 505 of FIG. 5). That is, in the flowchart of FIG. 2, results of the process for the frame images at the time t2 to t5 are "No" in step S203. The characters "o ha yo u" (506 of FIG. 6) is extracted from the frame image at the time t6. Process from step S204 to step S206 is performed for the frame image at the time t6.

The difference detecting module 130 acquires a difference between a character extraction result of a current frame image (at the time t6) and a character extraction result of a frame image (at the time t1) from which a character is extracted prior to the current frame image. An example of extraction of the difference is a method by pattern matching. The character extraction result at the time t6 is "o ha yo u" (506 of FIG. 5), and the character extraction result at the time t1 is "o" (501 of FIG. 5). Accordingly, the difference in this case becomes "ha yo u" (507 of FIG. 5).

The dividing module 140 divides the difference in accordance with the number of frame images between the current frame image (at the time t6) and the frame image (at the time t1) from which the character is extracted prior to the current frame image. In this case, the difference is divided by 5 (5 obtained by adding 1 to the number "4" of frames between the time t1 and the time t6). The result of equally dividing the difference into five parts is the left side of "ha" (512 of FIG. 5), the right side of "ha" (514 of FIG. 5), the left side of "yo" (516 of FIG. 5), the right side of "yo" and the left side of "u" (518 of FIG. 5), and the right side of "u" (520 of FIG. 5).

The synthesizing module 150 synthesizes the result at the time t1 ("A", 511 of FIG. 5) with a result (the left side of "ha", 512 of FIG. 4) obtained by dividing the difference, as a character recognition result of the frame image at the time t2. That is, as shown in FIG. 5(C), the synthesized result at the time 2 includes "o" and the left side of "ha" (513 of FIG. 5).

The same is true in the cases of the time t3 to the time t5. That is, as shown in FIG. 5(C), the synthesized results is "o ha" (515 of FIG. 5) at the time t3, "o ha" and the left side of "yo" (517 of FIG. 4) at the time t4, "o ha yo" and the left side of "u" (519 of FIG. 5) at the time t5, and "o ha yo u" (521 of FIG. 5) at the time t6. Then, each of the above character images is synthesized with the frame image.

Figure 6:
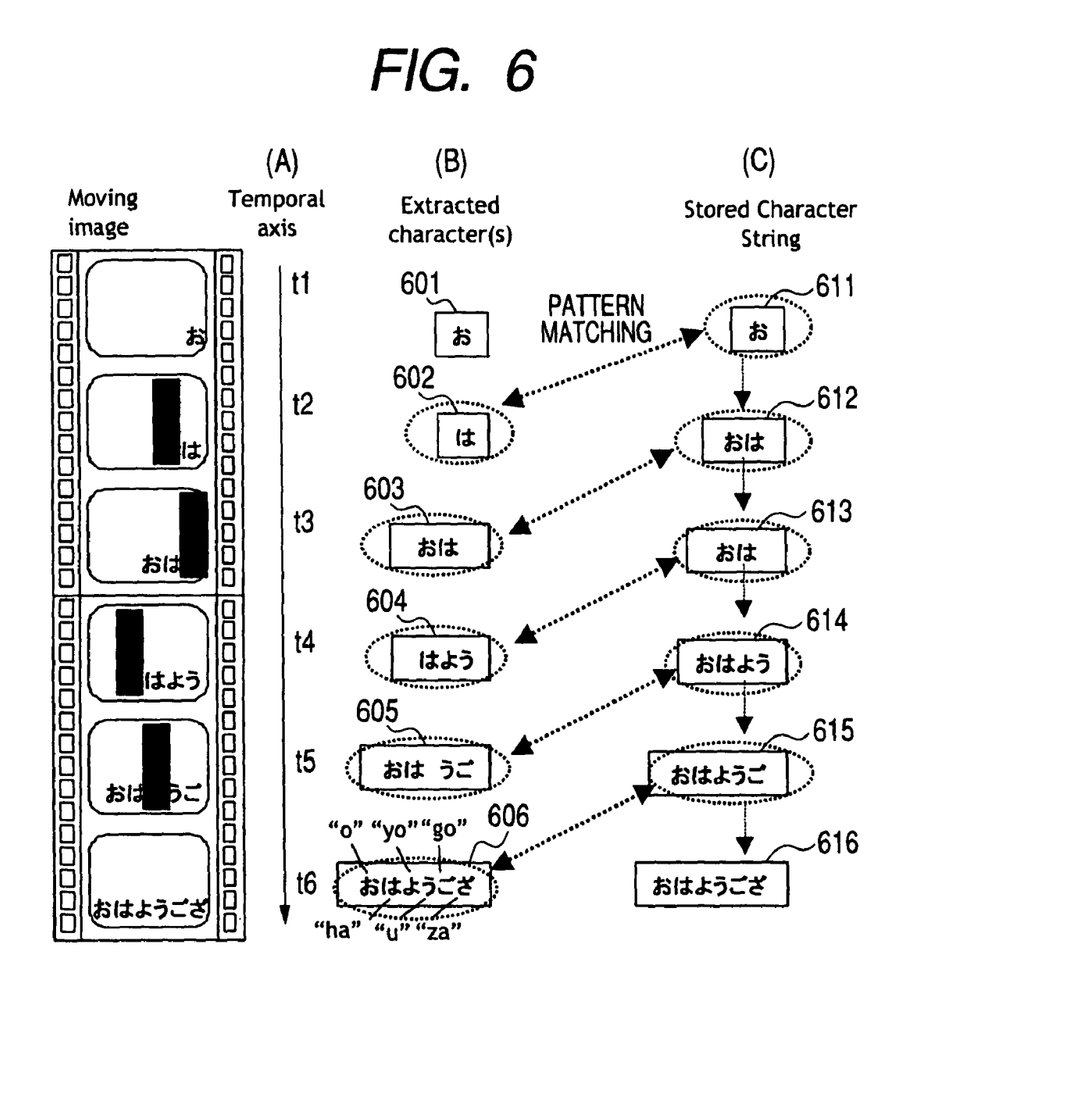
FIG. 6 is an explanatory view illustrating a specific example (example 4) of the character extracting process according to the exemplary embodiment.

FIG. 6 shows the case where characters could be extracted from any frame image, but some of the extracted characters are missing.

FIG. 6(A) shows (six) frame images of a moving image input by the plural-image input module 110 according to times bases (t1 to t6). As shown in this figure, a frame image at a time t1 is an image from which a black character "o" is read in a white background color. In frame images from a time t2 to a time t5, some of characters are missing due to the black background. That is, in the frame image at the time t2, a character "ha" is read, but a character "o" is missing. In the frame image at the time t3, characters "o ha" is read, but a character "yo" is missing. In the frame image at the time t4, the characters "ha yo u" is read, but the character "o" is missing. In the frame image at the time t5, characters "o ha" and "u go" is read, but the character "yo" is missing. A frame image at a time t6 is an image from which black characters "o ha yo u go za" is read in a white background color.

FIG. 6(B) shows results when the character extracting module 120 extracts characters from the frame images on the temporal axis. In this case, the character "o" (601 of FIG. 6) is extracted from the frame image at the time t1. The character "ha" (602 of FIG. 6) is extracted from the frame image at the time t2. The characters "o ha" (603 of FIG. 6) are extracted from the frame image at the time t3. The characters "h yo u" (604 of FIG. 6) are extracted from the frame image at the time t4. The characters "o ha u go" (605 of FIG. 6) are extracted from the frame image at the time t5. The characters "o ha yo u go za" (606 of FIG. 6) are extracted from the frame image at the time t6. That is, in the flowchart of FIG. 2, the process from Step S204 to Step 206 is performed for the frame images at the time bases t2 to t6.

Process at the-time t2 will be described.

In Step 204, the difference detecting module 130 acquires a difference between a character extraction result of a current frame image (at the time t2) and a character extraction result of a frame image (at the time t1) from which the character is be extracted prior to the current frame image. For example, as a result of pattern matching, it is detected that there is a difference between "o" (611 of FIG. 6) and "ha" (602 of FIG. 6).

In step S205, the dividing module 140 has a division number "1," and divides the difference by 1. Further, it is not necessary to perform this process since the number of divisions is "1."

In step S206, the synthesizing module 150 generates a character string according to time points when the characters appear, and appearance locations where the characters appear in the frame images. That is, in this case, although the both characters "o" and "ha" have the same appearance location, the time point of appearance of "o" is earlier than that of "ha." The generated character image is an image obtained by adding "ha" behind "o." In addition, "o ha" (612 of FIG. 6) is stored as a character extraction result of the current frame image (at the time t2). The generation positional information is recalculated in consideration of positional information on the following frame image, and the size of a character region of the preceding frame image. In this case, the positional information shifts by "o" of the previous frame image from the position of "ha" of the following frame image.

Next, process at the time t3 will be described.

In Step 204, the difference detecting module 130 acquires a difference between a character extraction result of a current frame image (at the time t3) and a character extraction result of a frame image (at the time t2) from which characters are extracted prior to the current frame image. For example, as a result of pattern matching, it is detected that there is no difference between "o ha" (612 of FIG. 6) and "o ha" (603 of FIG. 6).

In step S205, the dividing module 140 has a division number "1," and divides the difference by 1. It is not necessary to perform any process since the number of divisions is "1."

In step S206, the synthesizing module 150 stores a character extraction result of the current frame image (at the time t3). A stored character string is "o ha" (613 of FIG. 6). Further, the stored positional information is the positional information of the current frame image (at the time t3).

Next, process at the time t4 will be described.

In step 204, the difference detecting module 130 acquires a difference between a character extraction result of a current frame image (at the time t4) and a character extraction result of a frame image (at the time t3) from which characters are extracted prior to the current frame image. For example, as a result of pattern matching, it is detected that there is a difference between "o ha" (613 of FIG. 6) and "ha yo u" (604 of FIG. 6).

In step S205, the dividing module 140 has a division number "1," and divides the difference by 1. It is not necessary to perform any process since the number of divisions is "1."

In step S206, the synthesizing module 150 calculates a logical sum of "o ha" and "ha yo u" with using the pattern-matched character ("o" in this case) as a core. This generates "o ha yo u" (614 of FIG. 6). In addition, "o ha yo u" (614 of FIG. 6) is stored as a character extraction result of the current frame image (at the time t4). Further, the positional information is recalculated in consideration of the size of a character region of the previous frame image (at the time t3) with a character pattern-matched with using the positional information on the current frame image (at the time t4) as a core. In this case, the positional information shifts by "o" with using "ha" (pattern-matched character) of the following frame image as a center. Then, the generated character string is synthesized with a position indicated by the positional information acquired prior to the frame image at the time t4.

Next, process at the time t5 will be described.

In step 204, the difference detecting module 130 acquires a difference between a character extraction result of a current frame image (at the time t5) and a character extraction result of a frame image (at the time t4) from which characters are extracted prior to the current frame image. For example, as a result of pattern matching, it is detected that there is a difference between "o ha yo u" (614 of FIG. 6) and "o ha u go" (605 of FIG. 6).

In Step S205, the dividing module 140 has a division number "1," and divides the difference by 1. It is not necessary to perform any process since the number of divisions is "1."

In step S206, the synthesizing module 150 calculates a logical sum of "o ha yo u" and "o ha u go" with using the pattern-matched character(s) ("o ha" or "u" in this case) as a core. This generates "o ha yo u go" (615 of FIG. 6). In addition, "o ha you go" (615 of FIG. 6) is stored as a character extraction result of the current frame image (at the time t5). Further, the positional information is recalculated in consideration of the size of a character region of the previous frame image (at the time t4) with a character pattern-matched with using the positional information on the current frame image (at the time t5) as a core. In this case, since "o ha" (matched characters) of the current frame image is at the utmost ends of all the current frames, they are used as positional information as they are. Then, the generated character string is synthesized with a position indicated by the positional information acquired prior to the frame image at the time t5.

Next, processing at the time t6 will be described.

In step 204, the difference detecting module 130 acquires a difference between a character extraction result of a current frame image (at the time t6) and a character extraction result of a frame image (at the time t5) from which characters are extracted prior to the current frame image. For example, as a result of pattern matching, it is detected that there is a difference between "o ha yo u go" (615 of FIG. 6) and "o ha yo u go za" (606 of FIG. 6).

In step S205, the dividing module 140 has a division number "1," and divides the difference by 1. It is not necessary to perform any process since the number of divisions is "1."

In step S206, the synthesizing module 150 does not need to perform synthesizing since the character extraction result at the time t6 includes the character extraction result at the time t5, and the character position of the difference is a right end. In addition, "o ha yo u go za" (616 of FIG. 6) is stored as a character extraction result of the current frame image (at the time t6). The stored positional information is also the positional information in the current frame image.

It is also possible to perform a portion of the process (flowchart shown in FIG. 2) in this exemplary embodiment as follows. That is, the process shown in a flowchart of FIG. 7 may be added after Step S207 of FIG. 2.

Figure 7:
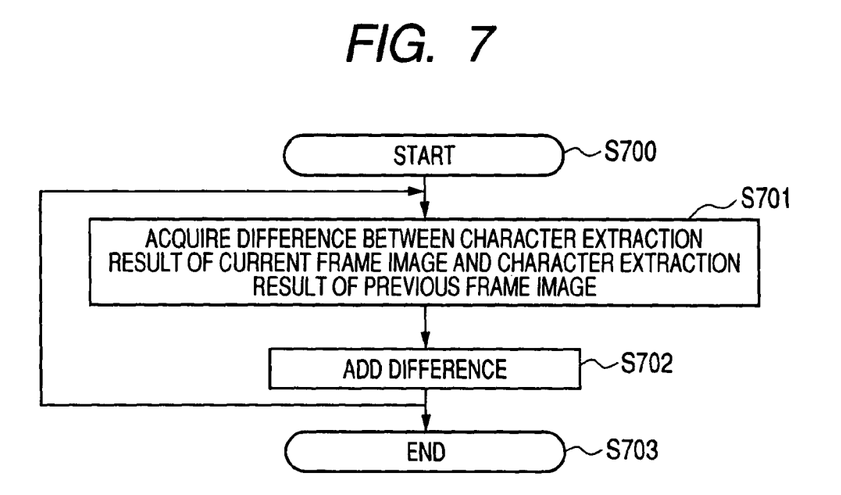
FIG. 7 is an exemplary flowchart showing a character string generating process according to the exemplary embodiment.

In Step S701, the difference between a character extraction result of a current frame image and a character extraction result of the previous frame image is acquired.

In Step S702, the difference in Step S701 is added to generate a character string.

These steps are repeated until any target frame image is not left.

Figure 8:
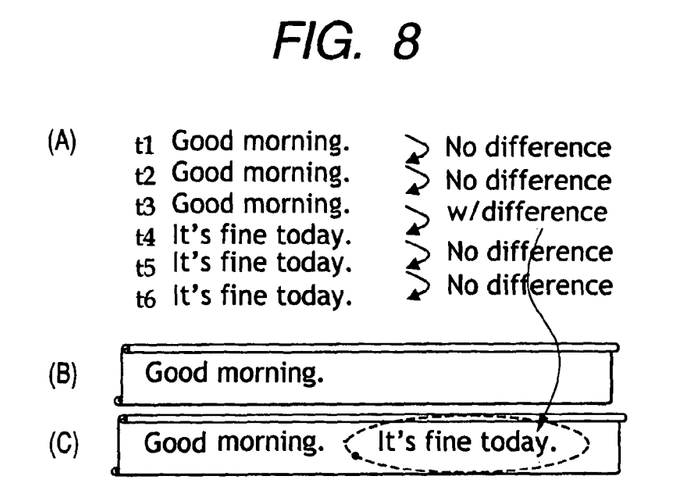
FIG. 8 is an explanatory view illustrating a specific example (example 1) of the character string generating process according to the exemplary embodiment.

Specific examples of the process will be given below. FIG. 8 shows the case where a character string is displayed in units of row. An example of such a case includes the case where a character string is displayed in units of row from the bottom of a screen.

The character extraction results, as shown in FIG. 8(A) are "Good morning." at the time t1, "Good morning." at the time t2, "Good morning." at the time t3, "It's fine today." at the time t4, "It's fine today." at the time t5, and "It's fine today." at the time t6.

It is determined in step S701 of the time t2 that there is no difference between the time t1 and the time t2, and there is no character to be added in step S702. Accordingly, the extracted character string is "Good morning." as shown in FIG. 8(B).

The same is true in the case of the time t3. That is, the extracted character string at this time point is "Good morning" as shown in FIG. 8(B).

A difference is detected in step S701 of the time t4. The difference is added in step S702. That is, the generated character string, as shown in FIG. 8 (C), is "Good morning. It's fine today."

Since no difference is detected at the time t5 and t6, the generated character string is "Good morning. It's fine today."

Figure 9:
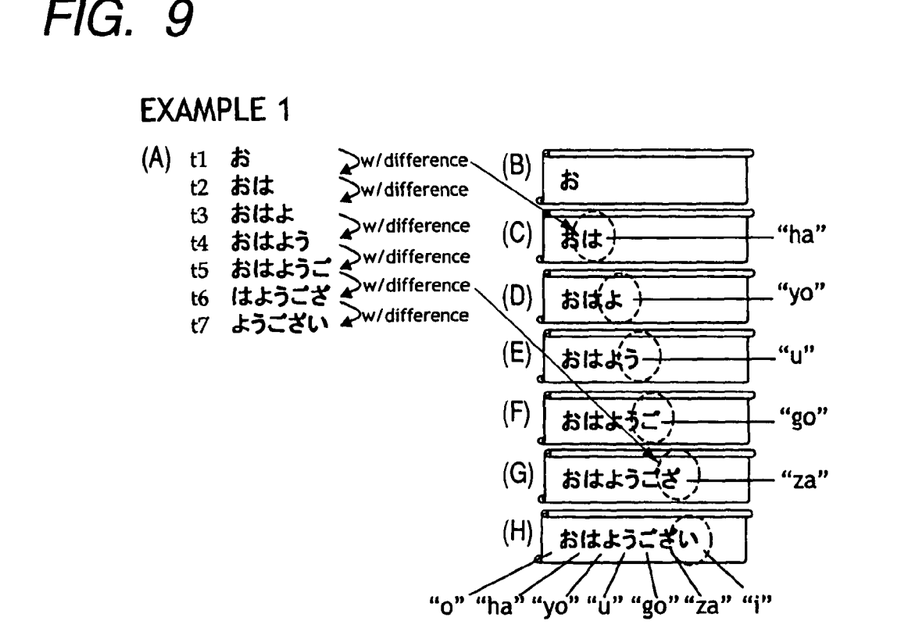
FIG. 9 is an explanatory view illustrating a specific example (example 2) of the character string generating process according to the exemplary embodiment.

FIG. 9 shows the case where characters are displayed with another character being added one by one. An example of such a case includes the case where characters are displayed one by one from the right of a screen, and the previous characters move to the left.

The character extraction results, as shown in FIG. 9(A), "o" at the time t1, "o ha" at the time t2, "o ha yo" at the time t3, "o ha yo u" at the time t4, "o ha yo u go" at the time t5, "ha yo u go za" at the time t6, "yo u go za i" at the time t7. That is, since the maximum number of characters which can be extracted at every time point is five, "o ha yo u go za i" cannot be extracted from one frame image.

In step S701, a difference is detected at each time point.

In step S702, the rightmost character that is a difference is added on the basis of the positional relationship within a frame image. Specifically, at the time t2, a difference between the time t1 and the time 2 is detected in step S701. Thus, the difference "ha" is added to the last of a character string, to thereby generate "o ha".

At the following time points, the same process is performed, to thereby generate a character string "o ha yo u go za i."

In particular, after extracted character strings are compared with each other, only a difference therebetween may be added. For example, "o ha yo u" and "o ha yo u go" are extracted at the time t4 and the time t5, respectively. In this case, only the difference "go" is added to the last of "o ha yo u" extracted at the time t4, to thereby generate "o ha yo u go".

Also, In the case where a character is added to an image from the right end thereof and one character is added and displayed in one frame, a simpler method may be adopted. The simple method will be described with reference to FIG. 10(F) FIG. 10 also shows the case where the same characters as those of FIG. 9 are displayed with another character being added one by one.

Figure 10:
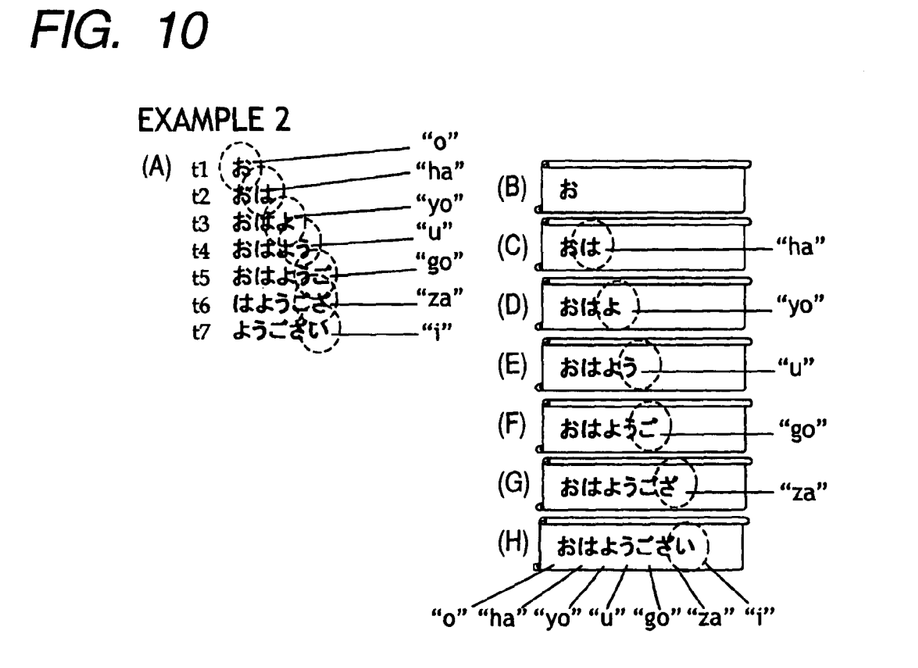
FIG. 10 is an explanatory view illustrating a specific example (example 3) of the character string generating process according to the exemplary embodiment.

Character extraction results shown in FIG. 10(A) are the same as those of FIG. 9(A).

By adding only one character at the right end that is the last character of the extracted characters, a character string is generated. Specifically, the character at the right end of the time t2 is "ha." This character is added to the end of a character string "o" (FIG. 10(B)) generated at the previous time t1, to thereby generate "o ha" (FIG. 10(C)). By repeating this process, as shown in FIG. 10(H), the character string "o ha yo u go za i" is finally generated.

The case where characters are in a captured image will be described with reference to FIG. 11.

An image which is to be processed by this exemplary embodiment does not necessarily need to be synthesized with characters, such as subtitles or telops, which are moving in a moving image. When a video camera is moved to capture characters on a signboard, etc., this situation is the same as the case where characters are moving.

Characters extracted from a moving image may be adopted when photographing conditions are good, like the case where all characters are captured in one frame image. However, this exemplary embodiment is useful even in the cases where characters become invisible as follows.

For example, there may be the followings.

The case where characters are moved and displayed in an electrical bulletin board, and missing of a character occurs without emitting light only in some portion of the electrical bulletin board.

The case where missing of a character occurs due to obstructions (a person, an automobile, etc.) during photographing.

The case where characters are hardly seen due to automatic backlight correction by a video camera, etc.

The case where missing of a character occurs due to the performance of character extraction and character recognition.

Here, a specific example will be described.

Figure 11:
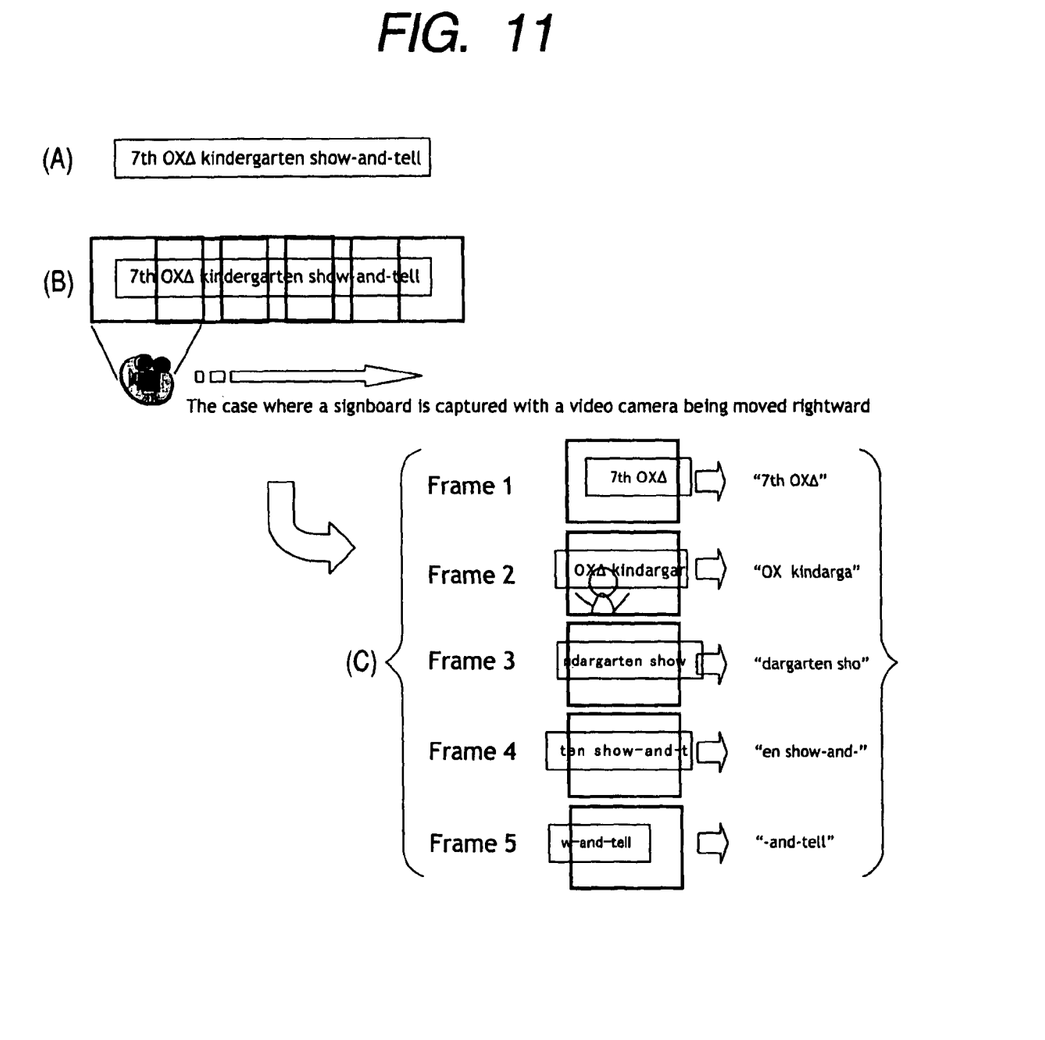
FIG. 11 is an explanatory view illustrating a specific example (example 5) of the character extracting process according to the exemplary embodiment.

For example, it is assumed that a video camera captures images of a signboard displaying "7th OXΔ kindergarten show-and-tell" while being moved to the right (see FIGS. 11(A) and 11(B)).

In this case, it is assumed that images from a frame 1 to a frame 5 are captured as shown in FIG. 11(C). Then, a character string "7th OXΔ" is extracted in the frame 1, a character string "OX kindarga" is extracted in a frame 2, a character string "dargarten sho" is extracted in a frame 3, a character string "en show-and-" is extracted in a frame 4, a character string "-and-tell" is extracted in the frame 5. However, since a person stands in front of the signboard in the frame 2, a character "Δ" which should be extracted is hidden. Even in such a case, the character string "7th OXΔ kindergarten show-and-tell" can be generated by the aforementioned processing of the exemplary embodiment.

Figure 12:
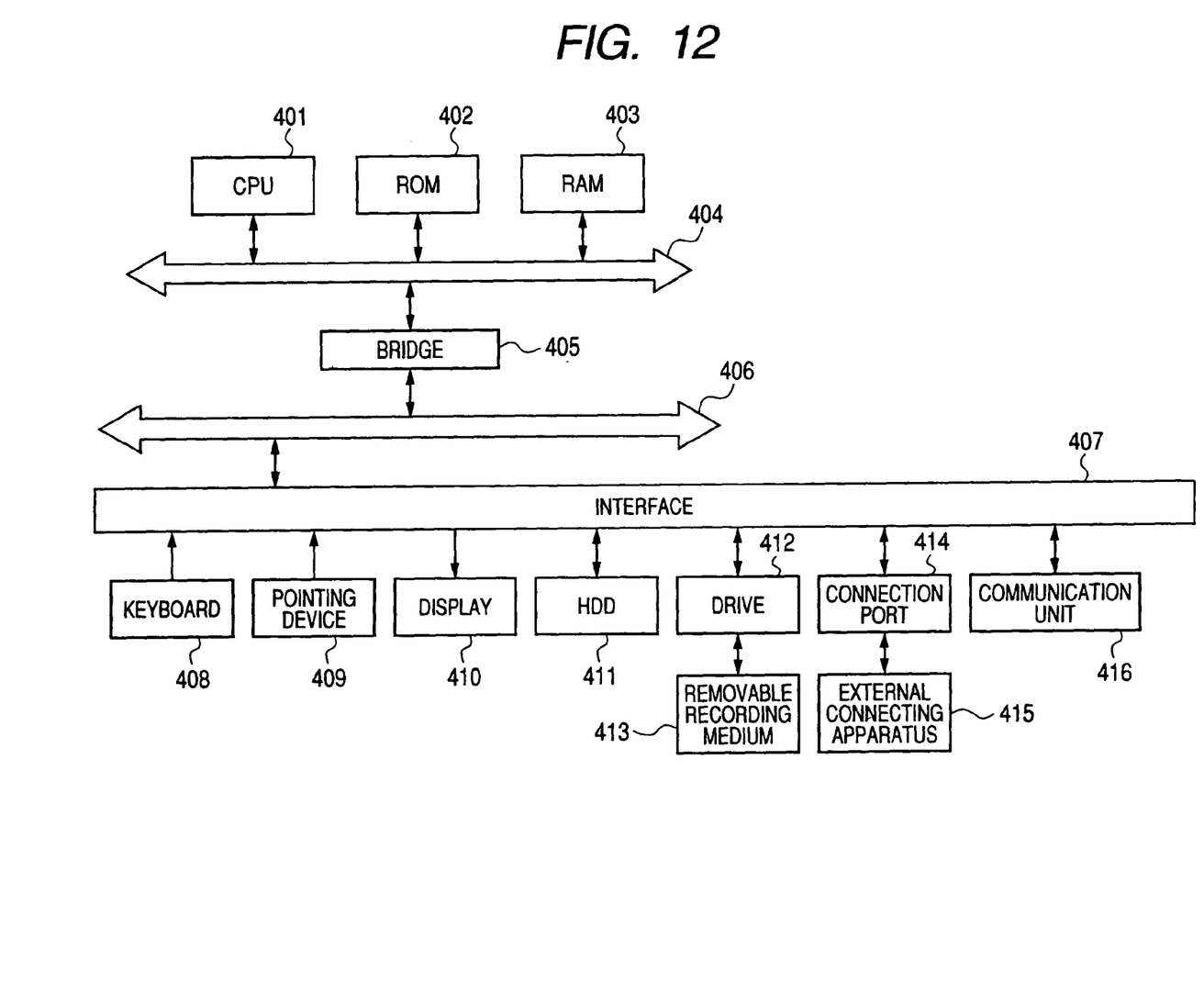
FIG. 12 is a block diagram showing an exemplary hardware configuration of the exemplary embodiment.

With reference to FIG. 12, an exemplary hardware configuration of an image processing system according to the embodiment will be described. A configuration shown in FIG. 12 is an image processing system constituted by, for example, a personal computer (PC), etc.

A CPU (Central Processing Unit) 401 is a control unit which executes processing according to computer programs which describe execution sequences of various kinds of modules described in the above-mentioned embodiment, i.e., the character extracting module 120, the difference detecting module 130, the dividing module 140, and the synthesizing module 150.

A ROM (Read-Only Memory) 402 stores programs, operation parameters, etc. to be used by the CPU 401. A RAM (Random Access Memory) 403 stores a program to be used during execution of the CPU 401, parameters (for example, results during character extraction) that appropriately vary during execution of the program, etc. These are connected with one another by a host bus 404 constituted by CPU paths, etc.

The host bus 404 is connected to an external bus 406, such as a PCI (Peripheral Component Interconnect/Interface) bus via a bridge 405.

A keyboard 408, and a pointing device 409, such as a mouse, are input devices operated by an operator. A display 410 is composed of a liquid crystal display or CRT (Cathode Ray Tube), and displays a moving image or various kinds of information (text, image information, etc.) that are targets to be processed in the exemplary embodiment.

A HDD (Hard Disk Drive) 411, which has a hard disk built therein, drives the hard disk, and records or reproduces programs to be executed by the CPU 401, moving images, various kinds of information. Images input by the plural-image input module 110, result data by the character extracting module 120, etc. are stored in the hard disk. Moreover, other various computer programs, such as various data processing programs, are stored in the hard disk.

A drive 412 reads data or programs recorded on a mounted removable recording medium 413, such as a magnetic disc, an optical disk, a magneto-optic disk, or semiconductor memory, and supplies the data or program to the RAM 403 connected via the interface 407, the external bus 406, the bridge 405, and the host bus 404. The removable recording medium 413 can also be used as the same data storage area as the hard disk.

A connection port 414, which is a port which connects with an external connecting apparatus 415, has connections, such as USB and IEEE 1394. The connection port 414 is connected to the CPU 401, etc via the interface 407, the external bus 406, the bridge 405, the host path 404, etc. A communication unit 416 is executed to a network to execute data communication processing with the outside.

In addition, the hardware configuration of the image processing system shown in FIG. 12 is an exemplary configuration, and the image processing system of the exemplary embodiment is not limited to the configuration shown in FIG. 12. Any configurations may be adopted if only they can execute the modules described in the exemplary embodiment. For example, some modules may be constituted by dedicated hardware (for example, ASIC etc.), and some modules may be located within an external system and be connected by a communication line. Moreover, a plurality of the systems shown in FIG. 12 may be connected with one another by a communication line so that they may cooperate with one another. Further, the system may be assembled into video cassette recorders, video cameras, digital cameras, information appliances, cellular phones, game machines, GPS, etc.

Although the exemplary embodiment shows that characters are synthesized with an image by the synthesizing module 150, characters may be given as an index of the image. That is, differences characters divided by the dividing module 140 may be associated with images between the "A" image and the "B" image as indexes. Here, the indexes are ones that are used when a moving image is edited or retrieved. Indexes may be given to all frames, respectively, and/or an index may be given to every scene. Further, in the case where extracted characters are text data, whenever the characters become a character string that forms one block semantically through morphological analysis thereof, they may be given to a frame image as an index. By doing so, convenience, such as editing and retrieval, is further enhanced. That is, the indexes can be utilized for fast forwarding or scene skipping.

Further, other methods of utilizing extracted character strings include the following ones.

(1) The character strings are utilized for the titles of videotapes.

(2) The character strings are used as keywords when a desired moving image is retrieved from a moving image database.

(3) The character strings are used as keywords when a plurality of moving images are sorted by category.

(4) The character strings can also be utilized for cellular phones, GPS, etc. if targets are restaurants, ground names, etc.

In the embodiment, only one character string has appeared in one frame image. However, for example, even when a row of upper character string and a row of lower character string exist simultaneously, it is possible to synthesize the character strings independently from each other from the positional relationship thereof, pattern matching of extracted character strings, etc.

In addition, the above-described programs can be stored in a recording medium, or the programs can be provided by communication means. In that case, for example, the above-described programs can also be grasped as inventions of "computer-readable recording media on which programs are recorded."

The expression "computer-readable recording media on which programs are recorded" means recording media on which programs that can be read by a computer are recorded, and which are used for installation or execution of programs, distribution of programs, etc.

In addition, the recording media includes, for example, digital versatile disks (DVDs), such as DVD-Rs, DVD-RWs, and DVDLRAMs, which are standards formulated in a DVD forum, and such as DVD+Rs and DVD+RW, which are standards formulated in a DVD+RW party, compact disks (CD), such as read-only memories (CD-ROMs), CD-recordables (CD-Rs), and CD-rewritables (CD-RWs), magneto-optic disks (MOs), flexible disks (FDs), magnetic tapes, hard disks, read-only memories (ROMs), electrically erasable programmable read-only memories (EEPROMs), flash memories, random access memories (RAMs), etc.

Also, the above programs or some of the programs can be saved or distributed in a state where they are recorded on the above recording media. Further, the above programs can be transmitted by communication, for example, using transmission media, such as local area networks (LANs), metropolitan area networks (MANs), wide area networks (WANs), and wired networks, wireless communication networks, or combined networks thereof which are used for the Internet, intranets, extranets, etc. Moreover, the above programs can also be delivered on a carrier.

Furthermore, the above programs may be portions of other programs, or may be recorded on recording mediums along with a separate program.

What is claimed is:

1. An image processing system comprising:
   an image input section that inputs images which are linked to each other in time series manner;
   a first character-extracting section that extracts a first character from a first image input by the image input section;
   a second character-extracting section that extracts a second character from a second image input by the image input section;
   a difference detecting section that detects a difference between the first character extracted by the first character-extracting section and the second character extracted by the second character-extracting section;
   a dividing section that divides the difference detected by the difference detecting section in accordance with number of images between the first image and the second image; and
   a synthesizing section that generates a character string in accordance with the first character extracted by the first character-extracting section and the second character extracted by the second character-extracting section.

2. The system according to claim 1, wherein the synthesizing section synthesizes the generated character string with the second image.

3. The system according to claim 1, wherein the synthesizing section that synthesizes portions obtained by dividing the difference, with respective images between the first image and the second image.

4. The system according to claim 1, further comprising:
   a third character-extracting section that extracts a third character from a third image which is input by the image input section and which is an image after the second image; and
   a difference detecting section that detects a difference between the first character extracted by the first character-extracting section and the third character extracted by the third character-extracting section, wherein:
   when the second character-extracting section cannot extract the second character and the difference detecting section cannot detect the difference, the synthesizing section synthesizes the first character extracted by the first character-extracting section or the third character extracted by the third character-extracting section, with the second image.

5. The system according to claim 1, further comprising:
a third character-extracting section that extracts a third character from a third image that is input by the image input section and that is an image after the second image;
a difference detecting section that detects a difference between the first character extracted by the first character-extracting section and the third character extracted by the third character-extracting section; and
a dividing section that divides the difference detected by the difference detecting section in accordance with number of images between the first image and the second image when the second character-extracting section cannot extract the second character and the difference detection section detects the difference, wherein:
the synthesizing section that synthesizes portions obtained by dividing the difference, with respective images between the first image and the third image.

6. The system according to claim 1, further comprising:
a difference detecting section that detects a difference between the first character extracted by the first character-extracting section and the second character extracted by the second character-extracting section, wherein:
when the difference detecting section detects the difference, the synthesizing section generates the character string in accordance with the first character extracted by the first character-extracting section and the second character extracted by the second character-extracting section.

7. The system according to claim 6, wherein when the difference detecting section detects the difference, the synthesizing section generates the character string by adding the second character extracted by the second character-extracting section after the first character extracted by the first character-extracting section.

8. The system according to claim 6, wherein when the difference detecting section detects the difference, the synthesizing section generates the character string by adding the difference detected after the first character extracted by the first character-extracting section.

9. The system according to claim 6, wherein when the difference detecting section detects the difference, the synthesizing section generates the character string by adding, after the first character extracted by the first character-extracting section, a last character of the second characters extracted by the second character-extracting section.

10. The system according to claim 1, further comprising:
an indexing section that associates portions obtained by dividing the difference by the dividing section, as indexes, with respective images between the first image and the second image.

11. The system according to claim 1, wherein the images input by the image input section are a moving image.

12. An image processing method comprising:
inputting images which are linked to each other in time series manner;
extracting a first character from a first image input by the image input section;
extracting a second character from a second image input by the image input section;
detecting a difference between the first character extracted from the first image and the second character extracted from the second image;
dividing the difference detected in accordance with number of images between the first image and the second image; and
generating a character string in accordance with the first character extracted by the first character-extracting section and the second character extracted by the second character-extracting section.

13. The method according to claim 12, further comprising:
synthesizing the generated character string with the second image.

14. The method according to claim 12, further comprising:
extracting a third character from a third image of the input images, the third image which is an image after the second image;
detecting a difference between the character extracted from the first image and the third character extracted from the third image; and
when the extracting of the second character from the second image cannot extract the second character and the detecting cannot detect the difference, synthesizing the first character extracted from the first image or synthesizing the third character extracted from the third image, with the second image.

15. The method according to claim 12, further comprising:
extracting a third character from a third image of the input images, the third image which is an image after the second image;
detecting a difference between the first character extracted from the first image and the third character extracted from the third image;
dividing the difference detected in accordance with number of images between the first image and the second image when the extracting of the second character from the second image cannot extract the second character and the detecting detects the difference; and
synthesizing portions obtained by dividing the difference, with respective images between the first image and the third image.

16. The method according to claim 12, further comprising:
detecting a difference between the first character extracted from the first image and the second character extracted from the second image, wherein:
when the detecting detects the difference, the generating generates the character string in accordance with the first character extracted from the first image and the second character extracted from the second image.

17. The method according to claim 12, wherein the input images constitute a moving image.

18. A non-transitory computer readable medium storing a program causing a computer to execute a process for image processing, the image processing comprising:
inputting images which are linked to each other in time series manner;
extracting a first character from a first image input by the image input section;
extracting a second character from a second image input by the image input section;
detecting a difference between the first character extracted from the first image and the second character extracted from the second image;
dividing the difference detected in accordance with number of images between the first image and the second image; and
generating a character string in accordance with the first character extracted by the first character-extracting section and the second character extracted by the second character-extracting section.

* * * * *